US008162262B2

(12) United States Patent
Kutzmann et al.

(10) Patent No.: US 8,162,262 B2
(45) Date of Patent: Apr. 24, 2012

(54) RECONFIGURABLE AIRCRAFT AND ASSOCIATED METHODS

(75) Inventors: Aaron J. Kutzmann, Long Beach, CA (US); Kevin R. Lutke, Huntington Beach, CA (US); Richard P. Ouellette, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 1281 days.

(21) Appl. No.: 11/831,806

(22) Filed: Jul. 31, 2007

(65) Prior Publication Data
US 2010/0025523 A1   Feb. 4, 2010

(51) Int. Cl.
*B64D 9/00* (2006.01)
(52) U.S. Cl. ............... 244/137.1; 244/118.1; 244/137.2; 244/137.4
(58) Field of Classification Search ............... 244/118.1, 244/137.1, 137.2, 137.4
See application file for complete search history.

(56) References Cited

U.S. PATENT DOCUMENTS

| | | | |
|---|---|---|---|
| 1,164,967 A | 12/1915 | Thorp | |
| 1,547,912 A | 7/1925 | Hall | |
| 1,731,091 A | 10/1929 | Clayton | |
| 1,869,506 A | 8/1932 | Richardson | |
| 3,167,278 A * | 1/1965 | Roberge | 244/137.4 |
| 3,520,502 A | 7/1970 | Smethers, Jr. | |
| 3,599,907 A | 8/1971 | Ramsom et al. | |
| 4,645,144 A | 2/1987 | Zupanick | |
| 4,890,751 A * | 1/1990 | Opdahl | 212/271 |
| 4,923,148 A | 5/1990 | Fillingham et al. | |
| 4,966,064 A * | 10/1990 | Kaustrater et al. | 89/46 |
| 5,103,712 A * | 4/1992 | Minovitch | 89/1.11 |
| 6,079,664 A * | 6/2000 | Salzberger | 244/1 TD |
| 6,606,933 B2 * | 8/2003 | Falk | 89/46 |
| 6,932,299 B2 * | 8/2005 | Beyerle et al. | 244/137.4 |
| 7,097,137 B2 | 8/2006 | McDonnell | |
| 7,104,499 B1 * | 9/2006 | Arata | 244/58 |
| 7,152,828 B1 * | 12/2006 | Garcia et al. | 244/135 A |
| 7,156,036 B2 | 1/2007 | Seiple | |
| 7,188,807 B2 * | 3/2007 | Smith | 244/135 A |
| 2005/0145752 A1 | 7/2005 | Beyerle et al. | |
| 2006/0202088 A1 * | 9/2006 | Padan | 244/137.1 |

FOREIGN PATENT DOCUMENTS

GB        2017617        3/1978

OTHER PUBLICATIONS

Search Report from UK Intellectual Property Office on co-pending UK application (GB081438.6) dated Nov. 27, 2008.
"CEROS Project Description", CEROS—National Defense Center of Excellence for Research in Ocean Sciences, pp. 1-2, Jun. 26 2006, http://www.ceros.org/documents/projectdescriptions/13%20PD_CTA_SoftRail_53798.pdf.
USPTO office action for U.S. Appl. No. 11/874,804 dated May 26, 2010.
Co-pending related US patent application filed Oct. 18, 2007; U.S. Appl. No. 11/874,804; Title: "*System and Methods for Airborne Launch and Recovery of Aircraft*".

* cited by examiner

*Primary Examiner* — Tien Dinh
*Assistant Examiner* — Justin Benedik
(74) *Attorney, Agent, or Firm* — Yee & Associates, P.C.

(57) ABSTRACT

A reconfigurable aircraft and associated methods. In one embodiment the reconfigurable aircraft comprises a plurality of payload retainers. The payload retainers are configured to receive and retain payloads, including fuel, armaments and sensors. The aircraft is configured to cooperate in flight with an airborne supply vehicle to receive the payloads from the supply vehicle.

15 Claims, 6 Drawing Sheets

RECONFIGURABLE AIRCRAFT AND ASSOCIATED METHODS

BACKGROUND

1. Technical Field

The present disclosure relates to military aircraft.

2. Description of Related Art

Typically tactical aircraft are configured for the conditions that they are expected to encounter on particular missions. For example, an aircraft will be configured with a large fuel supply and only light (or no) armament for a mission that is expected to involve long-term surveillance with limited (or no) enemy engagements. Conversely, an aircraft will be configured with a small fuel supply and heavy armament, if the mission is expected to be of short duration with heavy enemy engagement. Configuring aircraft in accordance with their anticipated mission conditions allows efficient use to be made of the limited payload capacities of aircraft.

One method of configuring an aircraft is to add external fuel tanks to the aircraft. The additional fuel capacity enables the aircraft to fly missions of relatively long distance and/or duration. However, external fuel tanks create drag and may limit the aircraft's maneuverability. In fact, often so much drag is created that the range of the aircraft is increased only by about half of what it would have been increased had the extra fuel capacity been created within the aircraft.

In practice, the actual distances flown and weaponry required will vary greatly within a given mission as the operational tempo changes. Aircraft configured for specific missions at launch frequently find that they are ill suited for the conditions they actually encounter. While manned aircraft endurance can be extended nearly indefinitely through aerial refueling, there are no known systems by which aircraft can be rearmed in flight. Today, once an aircraft has spent its weapons magazine, it must return to base, regardless of fuel state.

Armed unmanned air vehicles (UAV's) and unmanned combat air vehicles (UCAV's) are particularly sensitive to these problems. These types of aircraft typically fly long missions where the operational tempo can change dramatically over the course of a given mission. For example, a UAV may have been outfitted for a low intensity conflict (more fuel, less weapons), but over the course of its 30+ hour mission new conflicts may have flared up. In such situations, the hunter-killer aircraft may have more targets than weapons, forcing the UCAV to return to base with targets not prosecuted, or forcing commanders to launch additional aircraft. Launching more aircraft requires the commitment of additional resources to the battle theatre (with the requisite support and supplies) just to satisfy the possible need for increased firepower.

SUMMARY

The preferred embodiments of the present reconfigurable aircraft and associated methods have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description of the Preferred Embodiments", one will understand how the features of the present embodiments provide advantages, which include rapid reconfigurability in flight to match the needs of a changing operational tempo.

One aspect of the present embodiments includes the realization that it would be advantageous to be able to reconfigure an aircraft, such as a UCAV, in flight, during the course of a mission. Such reconfigurability could advantageously include the ability to rearm an aircraft in flight, to replenish its fuel supply, and/or to provide the aircraft with additional equipment, such as sensors. Of even greater advantage would be the ability to configure the aircraft differently from its launch configuration. For example, if the aircraft were launched with a large fuel supply and light armament, it would be advantageous to reconfigure in-flight to a lighter fuel supply and heavier or different armament.

In accordance with the above realizations, one embodiment of the present reconfigurable aircraft comprises an aircraft body including a nose portion and a tail portion. Wings extend laterally from the aircraft body. A propulsion system and a plurality of payload retainers are associated with the aircraft body. The payload retainers are configured to receive and retain payloads. The aircraft is configured to cooperate in flight with an airborne supply vehicle to receive payloads from the supply vehicle.

One embodiment of the present methods of reconfiguring an aircraft in flight comprises the steps of engaging the aircraft, in flight, with an airborne supply vehicle; transferring payloads from the supply vehicle to the aircraft; and disengaging the aircraft, in flight, from the airborne supply vehicle.

BRIEF DESCRIPTION OF THE DRAWINGS

The preferred embodiments of the present reconfigurable aircraft and associated methods will now be discussed in detail with an emphasis on highlighting the advantageous features. These embodiments depict the novel and non-obvious reconfigurable aircraft and associated methods shown in the accompanying drawings, which are for illustrative purposes only. These drawings include the following figures, in which like numerals indicate like parts.

DETAILED DESCRIPTION

Figure 1:
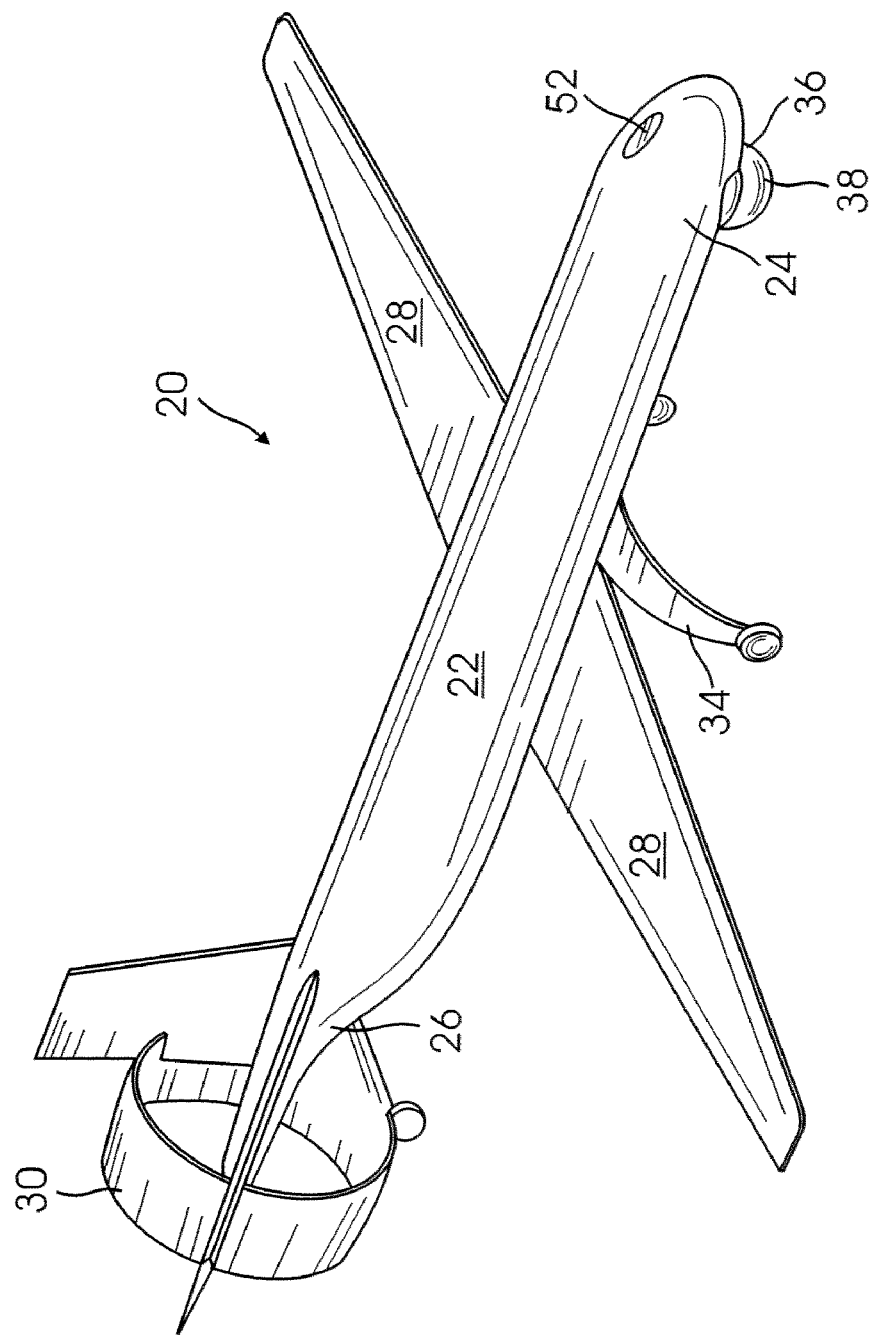
FIG. 1 is a front perspective view of a reconfigurable aircraft having features and advantages in accordance with the present embodiments.

With reference to FIG. 1, one embodiment of the present reconfigurable aircraft 20 includes an aircraft body 22 having a nose portion 24 and a tail portion 26. Wings 28 extend laterally from the aircraft body 22. In the illustrated embodiment, the wings 28 are located near a front-to-back center of the aircraft body 22. However, those of ordinary skill in the art will appreciate that the wings 28 could be located elsewhere.

Figure 2:
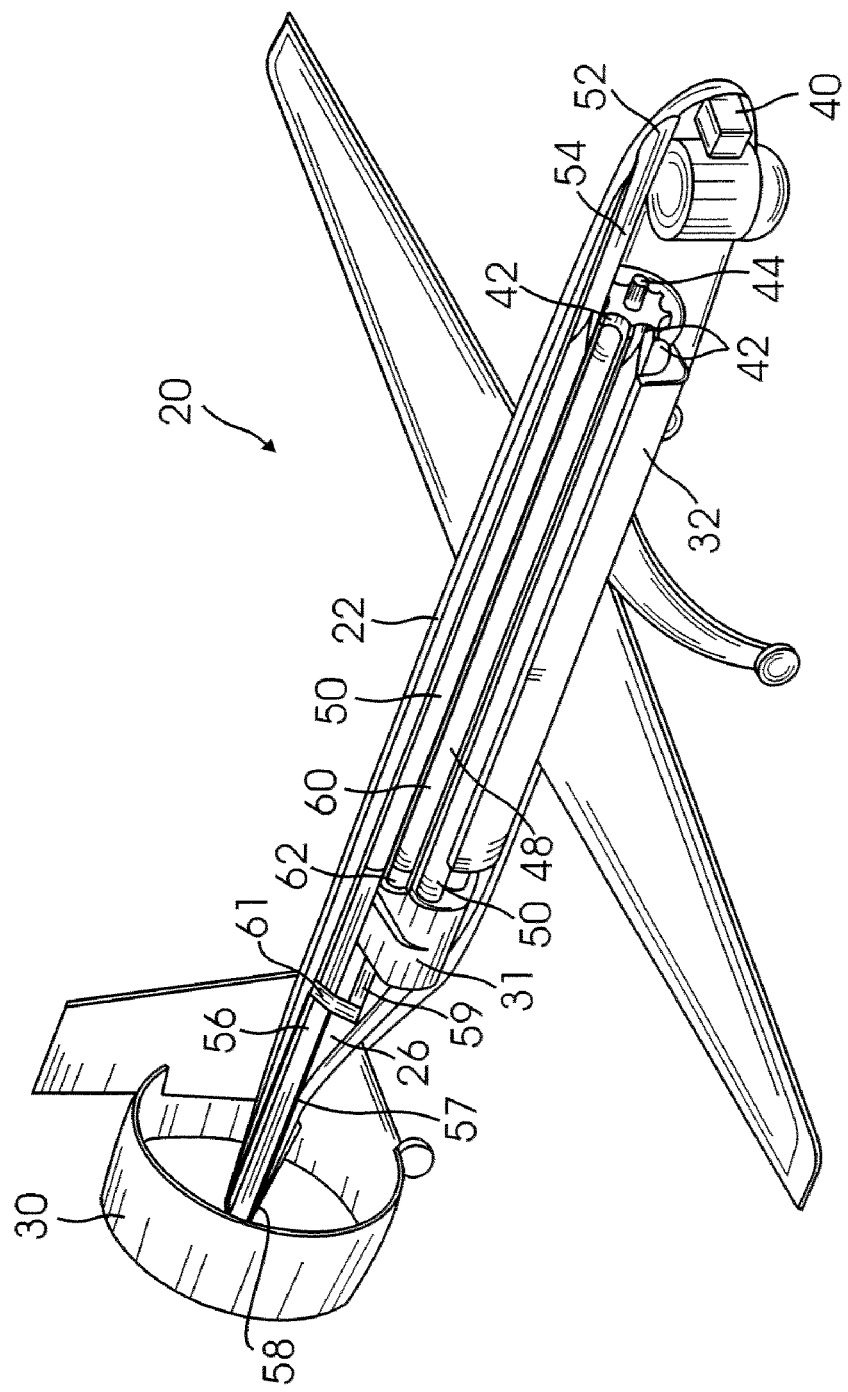
FIG. 2 is a partially sectioned front perspective view of the reconfigurable aircraft of FIG. 1, illustrating, inter alia, a rotatable rack and a plurality of payload retainers.

The aircraft 20 further includes a propulsion system. In the illustrated embodiment the propulsion system comprises a ducted fan 30 and is located in the tail portion 26. However, those of ordinary skill in the art will appreciate that the aircraft 20 could include a variety of alternative propulsion systems, such as propellers and jet engines, and the propulsion system could be located elsewhere on the aircraft 20, such as in the nose portion 24 or under the wings 28. In the figures, fan blades of the ducted fan 30 have been omitted for clarity. To power the propulsion system, the aircraft 20 further includes an engine 31 and a fuel supply housed within a fuel tank 32 (FIG. 2). In the illustrated embodiment, the engine 31 and the fuel tank 32 are located within the aircraft body 22. However, those of ordinary skill in the art will appreciate that these components could be located elsewhere. For example, the fuel tank could be located in the wings 28, and may be external to the aircraft 20. Similarly, the engine could be a jet engine mounted externally to the aircraft 20. The fuel supply may comprise, for example, a combustible liquid or gas, such as a hydrocarbon-based fuel or hydrogen.

With reference to FIG. 1, in the illustrated embodiment the aircraft 20 includes landing gear 34. However, those of ordinary skill in the art will appreciate that in alternative configurations the aircraft 20 may be adapted for aerial launch and recovery and, therefore, may not include landing gear 34. In the illustrated embodiment, the aircraft 20 is an unmanned air vehicle (UAV). However, those of ordinary skill in the art will appreciate that the features and advantages of the embodiments described herein are equally applicable to manned aircraft.

The aircraft 20 may further include surveillance equipment 36, such as one or more cameras, and weapons guidance systems 38, such as a laser designator. In the illustrated embodiment, these systems are located in the nose portion 24 of the aircraft 20, and are positioned on an underside of the aircraft body 22. Those of ordinary skill in the art will appreciate, however, that these systems may be located elsewhere, and may not be included at all. With reference to FIG. 2, in the illustrated embodiment the nose portion 24 further includes guidance systems 40. The illustrated aircraft 20 is a UAV, and therefore may include systems that enable self-guidance and/or remote control.

Figure 3:
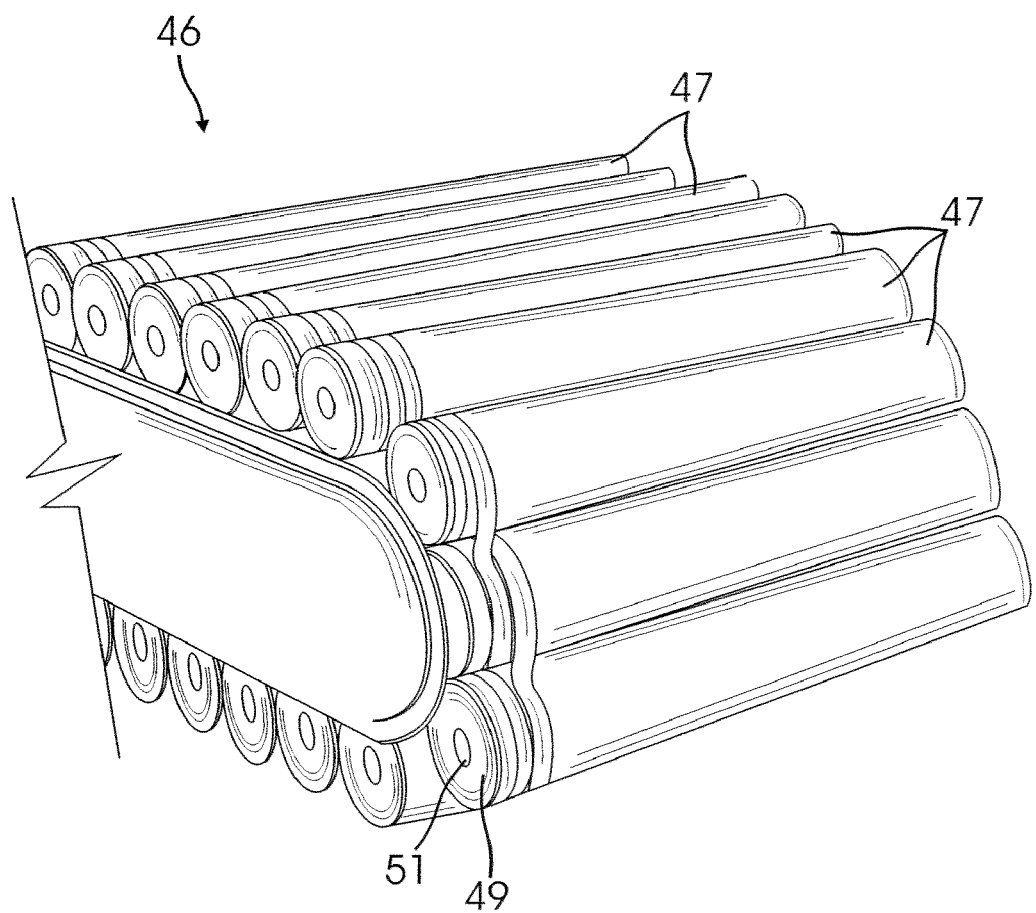
FIG. 3 is a rear perspective view of a belt-type rack and a plurality of payload retainers.

FIG. 2 illustrates a partially sectioned view of the present reconfigurable aircraft 20. In FIG. 2 a portion of the aircraft body 22 has been cut away to expose a plurality of payload retainers 42. In the illustrated embodiment, eight payload retainers 42 are arranged about a rotatable rack 44. Those of ordinary skill in the art will appreciate that the rack 44 may include fewer or more payload retainers 42. Those of ordinary skill in the art will further appreciate that racks having alternative configurations could be provided. The illustrated rack 44 is well suited for aircraft 20 having generally cylindrical bodies. However, for aircraft 20 having other form factors, such as "flying wing" type aircraft, a generally cylindrical rack may not be the best fitting option. For such applications, FIG. 3 illustrates a belt style rack 46 including a plurality of payload containers 47. The relatively small height and elongated width of the belt rack 46 allow it to fit within the body of a generally flat aircraft. Those of ordinary skill in the art will appreciate that belt style racks having other configurations could also be used for aircraft having different form factors.

The payload retainers 42 are configured to receive and retain a variety of payloads, including fuel, armaments and sensors. For example, in the illustrated embodiment the payload retainers 42 house fuel supply containers 48 and rockets 50. The rockets 50 may be, for example, 70 mm Hydra rockets, which may include guidance (also known as advanced precision kill weapon systems or APKWS) and/or warheads such as multi-purpose sub-munitions (MPSM). Examples of other armaments that could be used with the present payload retainers 42 include grenades, bullets and METAL STORM®-type gun barrels.

Embodiments of the present aircraft 20 are adapted to receive various payloads during an in-flight reconfiguration process. For example, in the illustrated embodiment the nose portion 24 of the aircraft body 22 includes a forward aperture 52 and a forward payload delivery/ejection passage 54 extending rearward from the aperture 52. During the reconfiguration process, described in further detail below, payloads may pass through the aperture 52 and the passage 54 to be received by the payload retainers 42. The rotatable rack 44 is configured to align each of the payload retainers 42 with the forward deliver/ejection passage 54. Empty payload retainers 42 can thus be aligned with the forward passage 54 as payloads are transferred to the aircraft 20. Occupied payload retainers 42 can likewise be aligned with the forward passage 54 to enable payloads to be ejected or launched from the aircraft 20, such as when the aircraft 20 identifies a target and fires a rocket or other armament. In this manner the rotatable rack 44 indexes the payload retainers 42 in a manner similar to the revolving cylinder of a pistol, with each payload retainer 42 being alternately in a loading/firing position and in a storage position. The forward passage 54 also may be located so that it lies on a line passing through the center of mass of the aircraft 20, so that reaction forces acting on the aircraft 20 as objects are launched or ejected do not produce unwanted torques on the aircraft 20, which could disturb the aircraft's flight path.

With continued reference to FIG. 2, the tail portion 26 of the aircraft body 22 also includes a rear payload delivery/ejection passage 56 extending rearward from the payload retainers 42. The rotatable rack 44 is configured to align each of the payload retainers 42 with the rear delivery/ejection passage 56, so that payloads can be transferred to and ejected from the aircraft 20 through the rear passage 56 in a manner similar to that described above with respect to the forward passage 54. Like the forward passage 54, the rear passage 56 also may be located so that it lies on a line passing through the center of mass of the aircraft 20.

In the illustrated embodiment, the rear passage 56 extends through a spinner hub 58 of the ducted fan 30. The rear passage 56 is thus able to accommodate solid objects, such as spent fuel containers, without the objects interfering with the rotating fan blades. In the illustrated embodiment, a concentric hub 57 extends around the rear passage 56. The spinner hub 58 is secured to the concentric hub 57. A driveshaft 59 of the engine 31 drives a belt 61, which extends around the concentric hub 57. The belt 61 drives the concentric hub 57, which in turn drives the spinner hub 58 and the ducted fan 30. Those of ordinary skill in the art will appreciate that the illustrated propulsion system is just one example, and that other propulsion systems could be provided instead.

Payloads transferred to the aircraft 20 may be housed in containers. For example, as illustrated in FIG. 2 the fuel supply containers 48 house extra fuel for the aircraft 20. The fuel containers 48 may be transferred to the aircraft 20 from an airborne supply vehicle, as further described below. The rotatable rack 44 may position each fuel container 48 so that it aligns with a fuel entry port (not shown). Fuel may then be transferred from the fuel container 48 into the fuel tank 32 aboard the aircraft 20. The aircraft's mission may advantageously be extended almost indefinitely by continually reconfiguring it with fresh fuel containers 48 from which the aircraft 20 can refill its internal fuel tank 32. Depleted fuel containers 48 may be ejected from the aircraft 20 through the forward or rear passages 54, 56. Empty fuel containers 48 may simply be ejected into the atmosphere to fall to the ground, or they may be transferred back to the supply vehicle during an in-flight reconfiguration process. The fuel containers 48 may be a thin-walled plastic so that if they are ejected to the atmosphere they will descend slowly before harmlessly landing.

The fuel containers 48 may include a small explosive charge to facilitate their ejection from the aircraft 20. For example, in the embodiment illustrated in FIG. 2 a rear end 60 of each fuel container 48 includes a small explosive charge 62. After the fuel in the container 48 is transferred to the aircraft's internal fuel tank 32, the rotatable rack 44 may align the fuel container 48 with the forward passage 54. Detonation of the charge 62 then ejects the spent fuel container 48 from the aircraft 20 through the aperture 52 at the front of the aircraft 20. Similarly, if types of payloads, such as armaments, are housed in payload containers, such as the payload containers 47 illustrated in FIG. 3, a rear end 49 of such a container 47 may also include a small explosive charge 51 to facilitate the ejection of the container 47 from the aircraft.

Those of ordinary skill in the art will appreciate that the fuel containers 48 may not include the explosive charges 62, and that alternative means for ejecting the fuel containers 48 may be provided. For example, the rotatable rack 44 may include a spring-loaded pin (not shown) configured to apply an impulse to each fuel container 48. Alternatively, the rotatable rack 44 may include powered rollers (not shown). A fuel container 48 resting on the rollers would be pushed out of its payload retainer 42 upon activation of the rollers.

With reference to FIGS. 4-7, the aircraft 20 is configured to cooperate in flight with an airborne supply vehicle 64 to receive payloads from the supply vehicle 64. The payloads may include fuel, armaments and/or sensors, and may be housed in containers such as the tubes 66 shown. In certain embodiments, payloads may also be transferred from the aircraft 20 to the supply vehicle 64. For example, if the aircraft 20 is carrying an expensive sensor it may be advantageous to transfer the sensor to the supply vehicle 64 rather than simply ejecting it to the atmosphere.

In the illustrated embodiment, the supply vehicle 64 is an aircraft, such as an airlifter. A payload storage and transfer apparatus 68 extends downward from an underside of the supply vehicle 64. In the illustrated embodiment, the payload storage and transfer apparatus 68 resembles an elongate fin. For example, a ramp of the airlifter could be removed and replaced with the fin 68. The fin 68 contains a plurality of payloads housed in containers 66 (FIG. 7) that may be transferred to the aircraft 20. The payloads may be transferred together with the tubes 66 from the supply vehicle 64 to the aircraft 20. Alternatively, the tubes 66 may remain within the fin 68, and the payloads may be transferred separately to the aircraft 20. The supply vehicle 64 may include an airlock (not shown) or similar device around a portion of the fin 68, so that the payloads 6 can be transferred to the aircraft 20 while an interior of the supply vehicle 64 remains pressurized.

Figure 4:
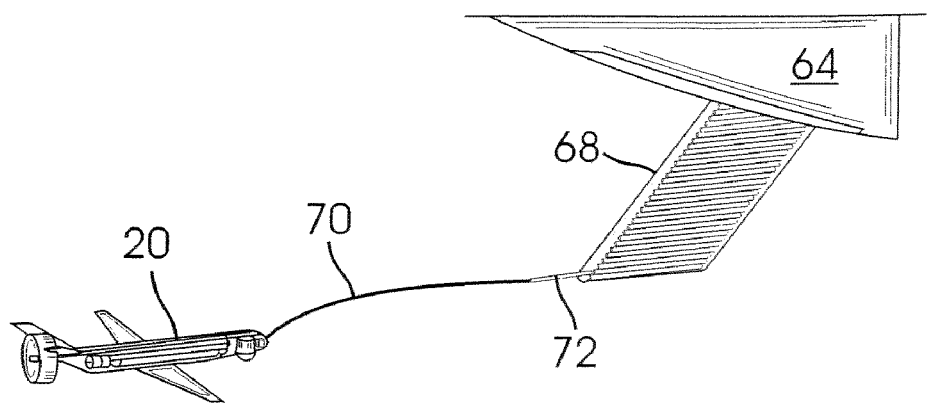
FIG. 4 is a rear perspective view of the reconfigurable aircraft of FIG. 1 and an airborne supply vehicle, illustrating one stage in a mid-flight reconfiguring method according to the present embodiments.
Figure 5:
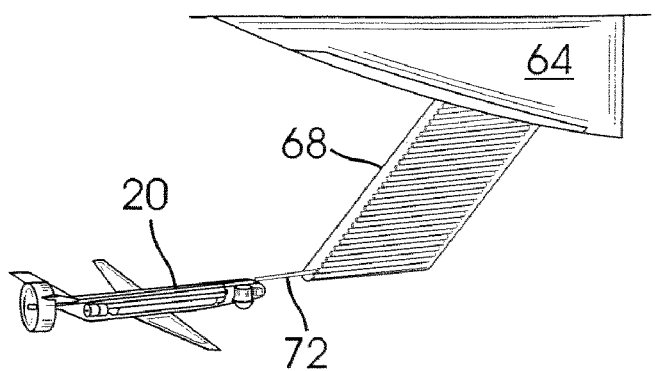
FIG. 5 is a rear perspective view of the reconfigurable aircraft and the airborne supply vehicle of FIG. 4, illustrating another stage in a mid-flight reconfiguring method according to the present embodiments.

With reference to FIG. 4, the supply vehicle 64 may include a tow line 70 extending from a lower end of the fin. To engage the supply vehicle 64, the aircraft 20 may capture the tow line 70 and be reeled in toward the fin 68, as illustrated in FIGS. 4 and 5. In certain embodiments the supply vehicle 64 and/or the aircraft 20 may include apparatus to establish a rigid connection between the two. Since the aircraft 20 and the supply vehicle 64 have different sizes and lift characteristics, they respond differently to turbulence. A rigid connection between the two craft assists in maintaining their relative positions and orientations, which lessens the likelihood that turbulence could cause a malfunction, such as a payload binding, during the process of transferring payloads to and/or from the aircraft 20.

Figure 6:
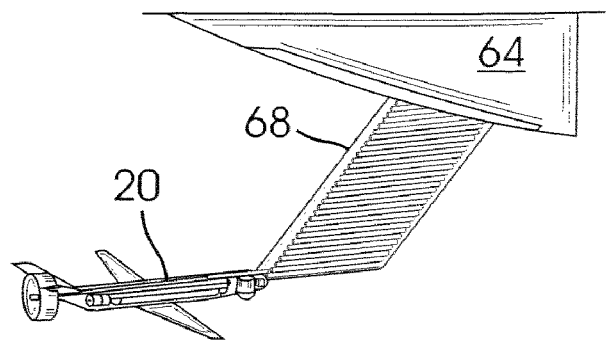
FIG. 6 is a rear perspective view of the reconfigurable aircraft and the airborne supply vehicle of FIG. 4, illustrating another stage in a mid-flight reconfiguring method according to the present embodiments.
Figure 7:
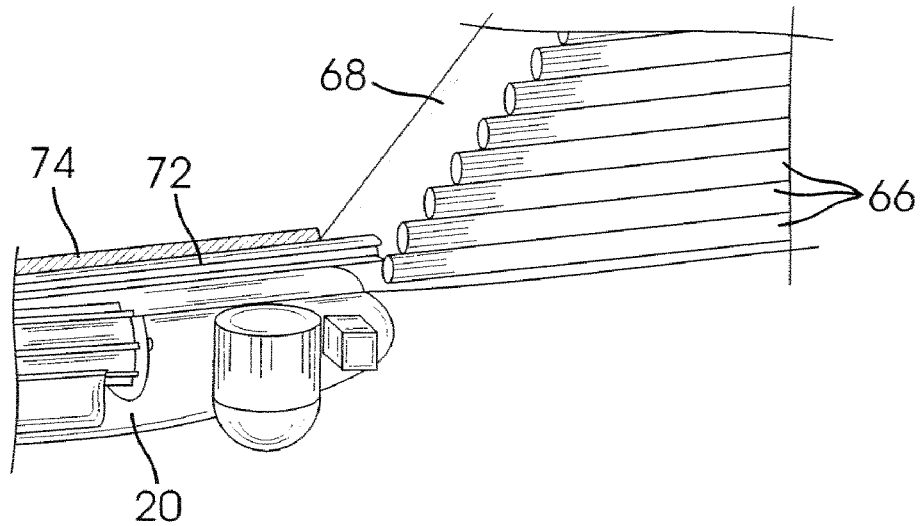
FIG. 7 is a rear perspective view detail of one embodiment of a rigid engagement between the reconfigurable aircraft and the airborne supply vehicle of FIG. 4.

In one embodiment, a rigid connection may be established by a rigid rail 72 extending rearward from a lower end of the fin (FIG. 5). As the aircraft 20 is reeled in, it eventually reaches the rail 72. The rail 72 engages a mating slot 74 (FIG. 7) in the aircraft 20, and the aircraft 20 proceeds completely to the fin 68 as the rail 72 slides completely into the slot 74, as illustrated in FIGS. 6 and 7. The engagement of the slot 74 and the rail 72 provides the advantageous rigid connection described above, because the rail 72 and slot 74 absorb any bending moments caused by turbulence that would otherwise tend to change the relative positions and orientations of the aircraft 20 and supply vehicle 64.

Figure 8:
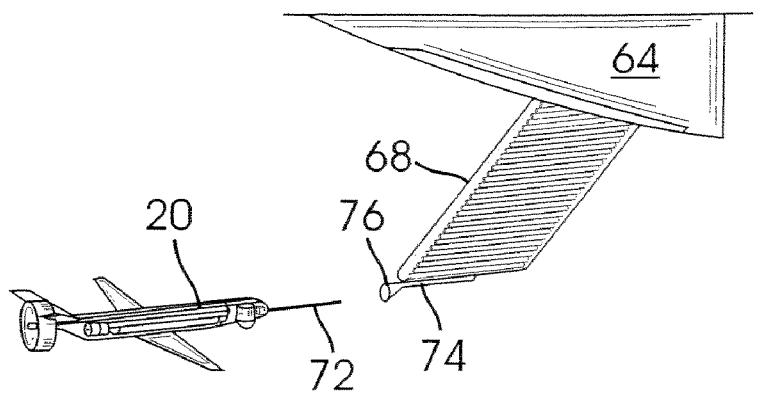
FIG. 8 is a rear perspective view of the reconfigurable aircraft of FIG. 1 and an airborne supply vehicle, illustrating one stage in another mid-flight reconfiguring method according to the present embodiments.
Figure 9:
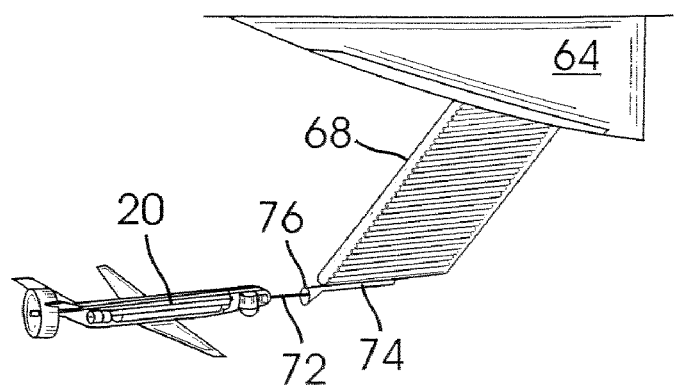
FIG. 9 is a rear perspective view of the reconfigurable aircraft and the airborne supply vehicle of FIG. 8, illustrating another stage in a mid-flight reconfiguring method according to the present embodiments.

In another embodiment, a rigid connection may be established by a rigid rail 72 extending forward from the aircraft 20 (FIG. 8). In such an embodiment, a lower end of the fin 68 may include an elongate slot 74 configured to receive the rail 72 in a similar fashion to the rail 72 and slot 74 engagement described above. The slot 74 on the lower end of the fin 68 may include a basket 76 at a rear end thereof (FIG. 9). The basket 76 is shaped as a funnel, so that the slot 74 presents a wide opening to the aircraft 20 that tapers inward to the relatively narrow slot 74. The aircraft 20 is thus able to approach the fin (FIG. 8), position the rail 72 within the basket 76, and allow the basket 76 to funnel the rail 72 into the slot 74 as the aircraft 20 moves forward relative to the fin 68.

Once the aircraft 20 has been safely secured to the fin 68, the supply vehicle 64 may pass payloads to the aircraft 20. For example, as shown in FIG. 7, the aircraft 20 may be positioned on the fin 68 so that its forward aperture 52 aligns with a payload dispensing region on the fin 68. The supply vehicle 64 may then dispense payloads from the fin 68 and into the aircraft 20 through the aperture 52 and through the forward payload delivery/ejection passage 54. Once a payload is safely received in an empty payload retainer 42, the rotatable rack 44 may move the received payload into a storage position and align an empty payload retainer 42 with the forward passage 54 to receive another payload. Loading may continue until all payload retainers 42 are full, or until the aircraft 20 is configured as desired for the next segment of its mission.

In certain embodiments, the aircraft 20 may be configured to transfer payloads to the supply vehicle 64 during the payload transfer process. For example, if the next segment of the aircraft's mission includes anticipated heavy fighting, the aircraft 20 may transfer a full fuel storage container 48 to the supply vehicle 64 in exchange for an armament payload. Also, the aircraft 20 may transfer empty payload containers to the supply vehicle 64 so that they can be refilled and transferred to the aircraft 20 at a later time or to other aircraft 20.

Figure 10:
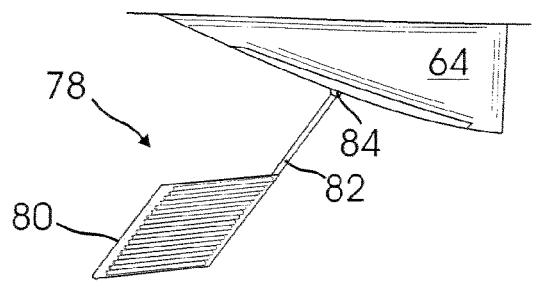
FIG. 10 is a rear perspective view of an airborne supply vehicle, illustrating one alternative embodiment for a payload transfer apparatus.

FIG. 10 illustrates an alternative embodiment of a payload storage and transfer apparatus 78. The illustrated payload storage and transfer apparatus 78 includes an elongate fin-shaped portion 80 similar to the embodiments shown in FIGS. 4-9. The fin 80 extends from an elongate member 82 that itself extends from an underside of the supply vehicle 64. In certain embodiments the supply vehicle 64 may include a pivot 84, such that the elongate member 82 is pivotable with respect to the supply vehicle 64. The pivotability of the elongate member 82 and the fin 80 with respect to the supply vehicle 64 facilitates the maintenance of the relative positions and orientations of the aircraft 20 and the fin 80 during the payload transfer operation. As explained above, the aircraft 20 and the supply vehicle 64 exhibit differing responses when they encounter turbulence. The ability of the fin 80 to swing at the end of the elongate member 82 contributes to the ability of the aircraft 20 and the supply vehicle 64 to absorb turbulence without disturbing the relative positions and orientations of the aircraft 20 and the fin 80.

Figure 11:
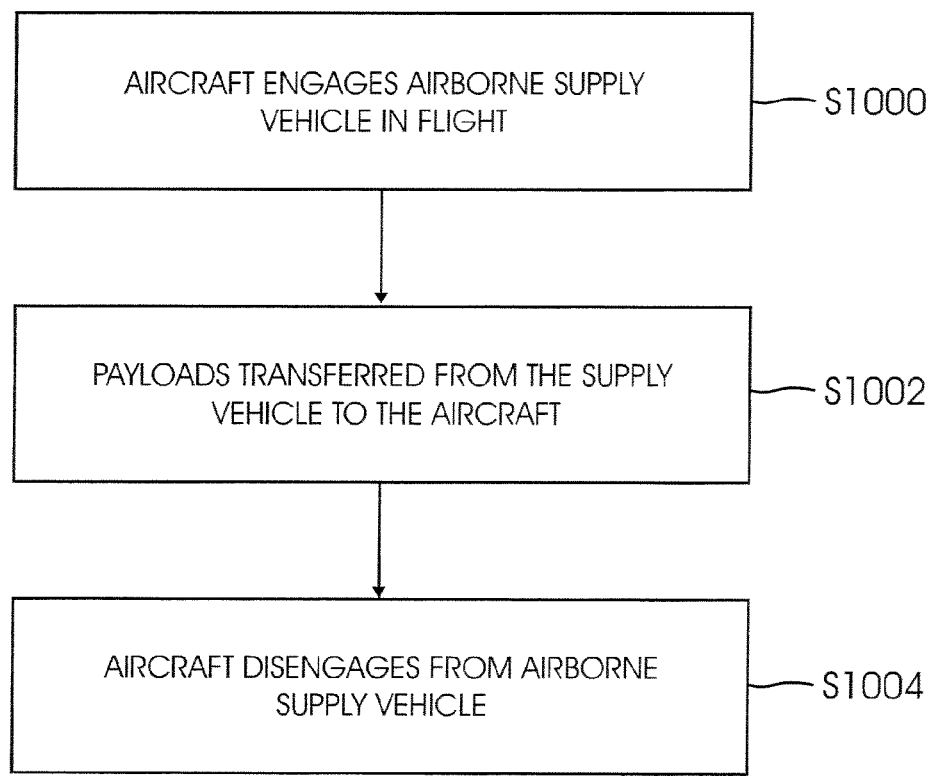
FIG. 11 is a flowchart illustrating one embodiment of a method of reconfiguring an aircraft in flight.

With reference to FIG. 11, one embodiment of a method of reconfiguring an aircraft in flight may proceed as follows. At step S1000 the aircraft may engage an airborne supply vehicle in flight. At least one of fuel and armaments may then be transferred from the supply vehicle to the aircraft, as shown at step S1002. The aircraft may then disengage from the airborne supply vehicle, as shown at step S1004.

The embodiments of the reconfigurable aircraft 20 described herein advantageously provide battlefield commanders with an asset that can be tailored on demand as dictated by battlefield conditions. For example, the aircraft 20 can be configured as a surveillance asset (fewer or no armaments and more fuel) and as an attack asset (more armaments and less fuel). And as the operational tempo of a mission varies, the aircraft 20 can be converted, in flight, from a surveillance asset to an attack asset and vice versa. Thus, no matter what the intensity of the operation is, the aircraft 20 is always well suited to the mission at hand. There is no need for the aircraft 20 to return to a land base in order to be reconfigured. This functionality enables large areas to be covered with relatively few of the present reconfigurable aircraft 20, because as the needs of the operation change, the aircraft 20 in theater can be quickly reconfigured near the battle/surveillance areas.

The above description presents the best mode contemplated for carrying out the present reconfigurable aircraft and associated methods, and of the manner and process of making and using them, in such full, clear, concise, and exact terms as to enable any person skilled in the art to which it pertains to make these aircraft and practice these methods. The present embodiments are, however, susceptible to modifications and alternate constructions from those discussed above that are fully equivalent. Consequently, the present aircraft and methods are not limited to the particular embodiments disclosed. On the contrary, the present aircraft and methods cover all modifications and alternate constructions coming within the spirit and scope of the present aircraft and methods as generally expressed by the following claims, which particularly point out and distinctly claim the subject matter of the present aircraft and methods.

What is claimed is:

1. A method of reconfiguring an aircraft in flight, the method comprising the steps of:
    engaging the aircraft, in flight, with an airborne supply vehicle;
    aligning a first payload retainer on the aircraft with a passage on the aircraft;
    transferring a first payload from the airborne supply vehicle to the first payload retainer on the aircraft via the passage;
    aligning a second payload retainer on the aircraft with the passage while the aircraft is engaged with the airborne supply vehicle;
    transferring a second payload from the airborne supply vehicle to the second payload retainer via the passage, wherein the first payload retainer and the second payload retainer are arranged on a movable rack; and
    disengaging the aircraft, in flight, from the airborne supply vehicle.

2. The method of claim 1, wherein the first payload and the second payload are selected from the group of payloads consisting of fuel, an armament and a sensor.

3. The method of claim 1, wherein the aircraft is an unmanned air vehicle (UAV).

4. The method of claim 1, wherein engaging the aircraft with the airborne supply vehicle comprises engaging an elongate rigid member associated with the airborne supply vehicle with a mating receptacle associated with the aircraft.

5. The method of claim 1, wherein engaging the aircraft with the airborne supply vehicle comprises engaging an elongate rigid member associated with the aircraft with a mating receptacle associated with the airborne supply vehicle.

6. The method of claim 1, wherein engaging the aircraft with the airborne supply vehicle comprises the aircraft capturing a tow line associated with the airborne supply vehicle and reeling the aircraft in toward the airborne supply vehicle.

7. The method of claim 1, wherein the first payload and the second payload are housed in containers located in a payload storage and transfer apparatus associated with the supply vehicle.

8. The method of claim 7, wherein at least a portion of the payload storage and transfer apparatus is shaped as an elongate fin.

9. The method of claim 8, wherein the elongate fin is secured at a first end of an elongate member extending from the supply vehicle.

10. The method of claim 7, wherein the containers are tubular.

11. The method of claim 1, wherein transferring the first payload from the supply vehicle to the aircraft comprises transferring a first container housing the first payload from the supply vehicle to the first payload retainer.

12. The method of claim 1, wherein the passage is connected to an aperture in a forward portion of the aircraft and wherein the first payload and the second payload are transferred into the passage from the airborne supply vehicle via the aperture.

13. The method of claim 1, further comprising:
    aligning a third payload retainer on the aircraft with the passage while the aircraft is engaged with the airborne supply vehicle; and
    transferring a third payload from the aircraft to the supply vehicle via the passage.

14. The method of claim 1, wherein the first payload retainer and the second payload retainer are arranged about a rotatable rack.

15. The method of claim 1, wherein the first payload retainer and the second payload retainer are arranged on a moveable belt rack.

* * * * *